US008328239B2

(12) United States Patent
Bäversten et al.

(10) Patent No.: US 8,328,239 B2
(45) Date of Patent: Dec. 11, 2012

(54) MECHANICAL ASSEMBLY FOR SECURING THE STRUCTURAL INTEGRITY OF A PIPE JOINT (75) Inventors: Bengt Bäversten, Västerås (SE); Arto Suoniemi, Ransta (SE)

(73) Assignee: Westinghouse Electric Sweden AB, Vasteras (SE)

( * ) Notice: Subject to any disclaimer, the term of this patent is extended or adjusted under 35 U.S.C. 154(b) by 516 days.

(21) Appl. No.: 12/518,373

(22) PCT Filed: Dec. 21, 2006

(86) PCT No.: PCT/SE2006/050614
§ 371 (c)(1),
(2), (4) Date: Jan. 21, 2010

(87) PCT Pub. No.: WO2008/076028
PCT Pub. Date: Jun. 26, 2008

(65) Prior Publication Data
US 2010/0140918 A1    Jun. 10, 2010

(51) Int. Cl.
*F16L 13/04* (2006.01)
(52) U.S. Cl. ........................................ 285/114; 285/191
(58) Field of Classification Search .................. 285/189, 285/191, 193, 192, 114, 115, 116
See application file for complete search history.

(56) References Cited

U.S. PATENT DOCUMENTS

| | | | | |
|---|---|---|---|---|
| 763,101 A | * | 6/1904 | Jones | 285/114 |
| 1,558,878 A | * | 10/1925 | Hitchcock | 285/114 |
| 3,451,697 A | | 6/1969 | Bula | |
| 4,109,941 A | * | 8/1978 | Wood et al. | 285/114 |
| 5,299,837 A | * | 4/1994 | Lagier | 285/114 |
| 5,735,551 A | | 4/1998 | Whitman et al. | |
| 5,791,697 A | * | 8/1998 | Godel et al. | 285/114 |
| 5,839,192 A | | 11/1998 | Weems et al. | |
| 5,964,029 A | | 10/1999 | Weems et al. | |

(Continued)

FOREIGN PATENT DOCUMENTS

EP    0 944 095 A1    9/1999

(Continued)

OTHER PUBLICATIONS

International Search Report for PCT/SE2006/050614 dated Sep. 12, 2007.

(Continued)

*Primary Examiner* — David E Bochna
(74) *Attorney, Agent, or Firm* — Alston & Bird LLP (57) ABSTRACT

A mechanical securing assembly (40) is adapted to secure the structural integrity of a flow passage formed by at least a first pipe part (41) and a second pipe part (42). The assembly comprises a connecting member (43), a first fastening member (44), attached to the connecting member and adapted to secure the connecting member to the first pipe part, and a second fastening member (45), attached to the connecting member and adapted to secure the connecting member to the second pipe part. The connecting member comprises a spring element (46) exerting a force pulling the first fastening member and the second fastening member towards each other along a primary axis (y), and thus being adapted to force the first pipe part and the second pipe part towards each other. The spring element is extendable along the primary axis by a compression of the spring element along a secondary axis forming an angle to the primary axis.

16 Claims, 9 Drawing Sheets

U.S. PATENT DOCUMENTS

| | | | |
|---|---|---|---|
| 6,053,652 A | 4/2000 | Deaver et al. | |
| 6,086,120 A | 7/2000 | Deaver et al. | |
| 6,108,391 A | 8/2000 | Deaver et al. | |
| 6,139,068 A * | 10/2000 | Burress et al. | 285/114 |
| 6,195,892 B1 | 3/2001 | Weems et al. | |
| 6,264,203 B1 | 7/2001 | Weems et al. | |
| 6,293,593 B1 | 9/2001 | Wivagg | |
| 6,305,651 B1 | 10/2001 | Wivagg | |
| 6,345,084 B1 | 2/2002 | Jensen | |
| 6,375,130 B1 | 4/2002 | Jensen et al. | |
| 6,375,230 B1 | 4/2002 | Jensen et al. | |
| 6,390,509 B1 | 5/2002 | Wivagg | |
| 6,421,406 B1 | 7/2002 | Jensen | |
| 6,456,682 B1 * | 9/2002 | Jensen | 285/191 |
| 6,464,424 B1 | 10/2002 | Weems et al. | |
| 6,467,814 B1 | 10/2002 | Wivagg | |
| 7,665,771 B2 * | 2/2010 | Roos | 285/236 |
| 7,724,863 B2 * | 5/2010 | Jensen | 376/352 |
| 7,871,111 B2 * | 1/2011 | Jensen | 285/81 |
| 2006/0082139 A1 | 4/2006 | Jensen | |

FOREIGN PATENT DOCUMENTS

| | | |
|---|---|---|
| FR | 2 334 095 A1 | 7/1977 |
| WO | WO 98/25071 A1 | 6/1998 |

OTHER PUBLICATIONS

Supplementary European Search Report for European Patent Application No. EP 06 83 5967, completed Feb. 25, 2011.

* cited by examiner

MECHANICAL ASSEMBLY FOR SECURING THE STRUCTURAL INTEGRITY OF A PIPE JOINT

TECHNICAL FIELD OF THE INVENTION

The present invention relates generally to the field of repairing cracked pipes in nuclear plants. More specifically, the present invention refers to a mechanical securing assembly for securing the structural integrity of a pipe joint of two or more pipes or a pipe forming a fluid passage in a nuclear plant. Especially, the present invention refers to a mechanical securing assembly adapted to secure the structural integrity of a flow passage formed by at least a first pipe part and a second pipe part, the assembly comprising a connecting member; a first fastening member attached to the connecting member and adapted to secure the connecting member to the first pipe part; and a second fastening member attached to the connecting member and adapted to secure the connecting member to the second pipe part, wherein the connecting member comprises a spring element exerting a force pulling the first fastening member and the second fastening member towards each other along a primary axis, and thus being adapted to force the first pipe part and the second pipe part towards each other.

BACKGROUND OF THE INVENTION AND PRIOR ART

A nuclear reactor in a nuclear plant has a reactor pressure vessel, RPV, which typically has a generally cylindrical shape and is closed in both ends, e.g., by a bottom head and a removable top head, to form a closed container. A core plate and a top guide are arranged inside the reactor pressure vessel with the top guide arranged on top of the core plate. The top guide comprises a number of holes. A reactor core in the form of fuel bundles is arranged inside the reactor pressure vessel with each fuel bundle being arranged through a hole in the top guide and resting on the core plate. Some reactors are provided with a core shroud which surrounds the core, the core plate and the top guide.

The reactor pressure vessel is filled with water covering the core and the shroud. The water in the reactor pressure vessel is arranged to flow through the core in order to cool the core during operation of the nuclear reactor. The flow is usually induced by circulation pumps arranged between the shroud and the nuclear reactor pressure vessel which makes the water flow downwards in the space between the shroud and the reactor pressure vessel wall. The circulation pumps may be of any of a number of different types.

In case of a so-called loss-of-coolant accident, LOCA, a rupturing of the recirculation duct system or the steam duct system during operation can cause coolant water to flow out of the reactor pressure vessel, thereby lowering the water level in the reactor pressure vessel and exposing the core in such a way that the fuel assemblies may be overheated and damaged. In order to prevent such overheating, the nuclear reactor comprises a core spray system including core spray supply piping, which is supplied via an inlet T-box assembly and connected to an upper tubular core spray sparger and a lower tubular core spray sparger above the core via a respective T-box assembly. The joints between the T-box assembly and the core spray spargers may be subjected to stress corrosion after long term use as acknowledged in U.S. Pat. No. 5,964,029. Such stress corrosion can result in cracks which can lead to leakage. Various methods and devices have been proposed for repairing such cracks.

U.S. Pat. No. 5,964,029 discloses a mechanical securing device adapted to secure and maintain a tubular cracked piping in a boiling water reactor. The known device comprises a first clamp operative to secure the device to a piping on one side of a crack, and a second clamp operative to secure the device to the piping on the opposite side of the crack. A bolt is connected between the clamps to exert an axial force tending to close the crack. A spring element disposed between the bolt and at least one of the clamps for maintaining a tensile force during thermal transients when the piping tends to contract due to the introduction of cold core spray water.

US 2006/0082139 discloses a core spray sparger T-box clamp apparatus adapted to be mounted to the T-box for a lower internal sparger inside a shroud of a reactor vessel.

U.S. Pat. No. 6,375,130 discloses an apparatus for clamping a core spray distribution header, comprising a first clamp on a first distribution header pipe, a second clamp on a second distribution header pipe and a connection body block connecting the first and second clamps. Each clamp has an upper clamp body and a lower clamp body. Also the connection body block has an upper body and a lower body.

For instance the T-box assemblies at the core spray spargers are provided at a location in the reactor pressure vessel, which is difficult to reach for maintenance, repair or replacement. Since the repair has to be performed under a short period of time, there is a need for an assembly which may be mounted in an easy and quick manner.

SUMMARY OF THE INVENTION

The object of the present invention is to provide an assembly for repairing and securing piping in a nuclear reactor. A further object is to provide such an assembly that is easy to mount and attach to defect pipes. A still further object is to provide such an assembly, which secure the structural integrity of the fluid passage in an reliable manner. A still further object is to provide such an assembly which is adapted to compensate for dimensional changes at the clamping areas caused by temperature variations.

These and further objects are achieved by the mechanical securing assembly initially defined which is characterized in that the spring element is extendable along the primary axis by a compression of the spring element along a secondary axis forming an angle to the primary axis.

By means of such a spring element the mounting of the assembly is facilitated. By compressing the spring element, by any suitable tool, the connecting member is prolonged so that it may more easily be attached to the pipe parts at any locations which possibly have been prepared in advance to receive the first and second fastening members. When the attachment of the first and second fastening member is complete, the compressing force is released, whereby the spring element will exert a force pulling the first fastening member and the second fastening member towards each other along a primary axis, and thus also the first pipe part and the second pipe part towards each other. Such a spring element will provide a sufficient force also if the pipes to be secured are subjected to length changes due to temperature variations. Consequently, the structural integrity of the fluid passage, which is at least partly formed by the pipe parts may be secured in a convenient manner. It is to be noted that the assembly is suitable for securing the two pipe parts directly against each other to provide a structurally integrated pipe at any location in the nuclear plant or nuclear reactor. The assembly is also suitable for securing the two pipe parts towards each other in case there is an intermediate component between the pipe parts, which constitutes a further part of the fluid passage. Such an intermediate component may, for instance, be any one of the T-box assemblies included in the nuclear plant.

According to an embodiment of the invention, the spring element has an annular shape. Such an annular shape may be circular or substantially circular, oval, elliptic or the like. Also a polygonal basic shape is possible, although the corners of such polygon advantageously are rounded.

According to a further embodiment of the invention, the connecting member has a first portion, extending between the first fastening member and the spring element, and a second portion extending between the second fastening member and the spring element. Advantageously, the first portion and the second portion may extend in opposite directions from the spring element, e.g. in parallel with the primary axis.

According to a further embodiment of the invention, the spring element is made of sheet metal. All parts of the connecting member, i.e. the spring element, the first portion and the second portion, may thus form an integrated part made of one single piece of sheet material. The connecting member may have a flat or plane shape.

According to a further embodiment of the invention, each of the first fastening member and the second fastening member comprises a primary bolt member adapted to be secured in a primary recess in the first pipe part and the second pipe part, respectively. Such a bolt member may in an easy manner be attached to the pipe part only by being inserted through a straight movement. The recess may advantageously have a bottom, but may also according to an alternative embodiment extend through the wall of the pipe part.

According to a further embodiment of the invention, the assembly comprises means adapted to secure the connecting member to the pipe parts with respect to a direction being perpendicular to the primary axis. In case the fastening member is attached merely by one primary bolt inserted into the recess, the connecting member is advantageously also secured in the direction perpendicular to the primary axis by such means in order to reduce the risk that the connecting member is released from the pipe parts. To that end such means may comprise, in each of the first fastening member and the second fastening member, a secondary bolt member adapted to be secured in a secondary recess in the first pipe part and the second pipe part, respectively. Each of the primary bolt members may extend along a primary direction into the primary recess and each of the secondary bolt members along a secondary direction into the secondary recess, wherein the primary direction then may form an angle with the secondary direction. In such a manner, the connecting member is secured at the pipe parts.

According to an alternative embodiment of the invention, each of the primary bolt members extends along a primary direction into the primary recess and each of the secondary bolt members extends along a secondary direction into the secondary recess, wherein the primary direction is substantially opposite to the secondary direction.

According to a further embodiment of the invention, said means comprises a clamping member adapted to secure the connecting member to the pipe parts with respect to a direction being perpendicular to the primary axis by enclosing at least a part of an outer periphery of at least one of the first pipe part and the second pipe part. With such a clamping member only one primary bolt member for each pipe part is needed. Such a clamping member may be specifically adapted to extend partly around one of the pipe parts connected to an intermediate T-box assembly. The clamping member may then comprise a first plate provided outside the spring element and comprising a first clamp element, and a second plate provided outside the first plate and comprising a second clamp element, wherein the plates are rotatable relatively to each other to displace the clamp elements towards and away from each other.

According to a further embodiment of the invention, the assembly comprises a further connecting member; a further first fastening member attached to the further connecting member and adapted to secure the further connecting member to the first pipe part; and a further second fastening member attached to the further connecting member and adapted to secure the further connecting member to the second pipe part, wherein the further connecting member comprises a spring element exerting a force pulling the further first fastening member and the further second fastening member towards each other along a primary axis, and thus being adapted to force the first pipe part and the second pipe part towards each other, and wherein the spring element is extendable along the primary axis by a compression of the spring element along a secondary axis forming an angle to the primary axis. An assembly having two such connecting members may be secured in a reliable manner to the pipe parts. Each of the further first fastening member and the further second fastening member may then comprise a primary bolt member adapted to be secured in a primary recess in the first pipe part and the second pipe part, respectively.

According to a further embodiment of the invention, the assembly is adapted to secure and maintain a tubular T-connection assembly in a nuclear reactor, the tubular T-connection assembly being formed by a main pipe extending along a longitudinal axis and having cylindrical wall and a closed end, the first pipe part and the second pipe part, the first pipe part being connected to the main pipe via the cylindrical wall at a first interface, the second pipe part being connected to the main pipe via the cylindrical wall at a second interface and the first and second pipe parts extending outwardly from the cylindrical wall in a opposite directions along the primary axis. Advantageously, the plates may be adapted to be provided outside the closed end of the main pipe.

According to a further embodiment of the invention, the primary axis is perpendicular or substantially perpendicular to the longitudinal axis.

According to a further embodiment of the invention, the primary axis is perpendicular or substantially perpendicular to the secondary axis.

According to a further embodiment of the invention, an intermediate pipe part is arranged between the first pipe part and the second pipe part.

BRIEF DESCRIPTION OF THE DRAWINGS

The present invention is now to be explained more closely through the description of various embodiments and with reference to the drawings attached hereto.

DETAILED DESCRIPTION OF VARIOUS EMBODIMENTS OF THE INVENTION

Figure 1:
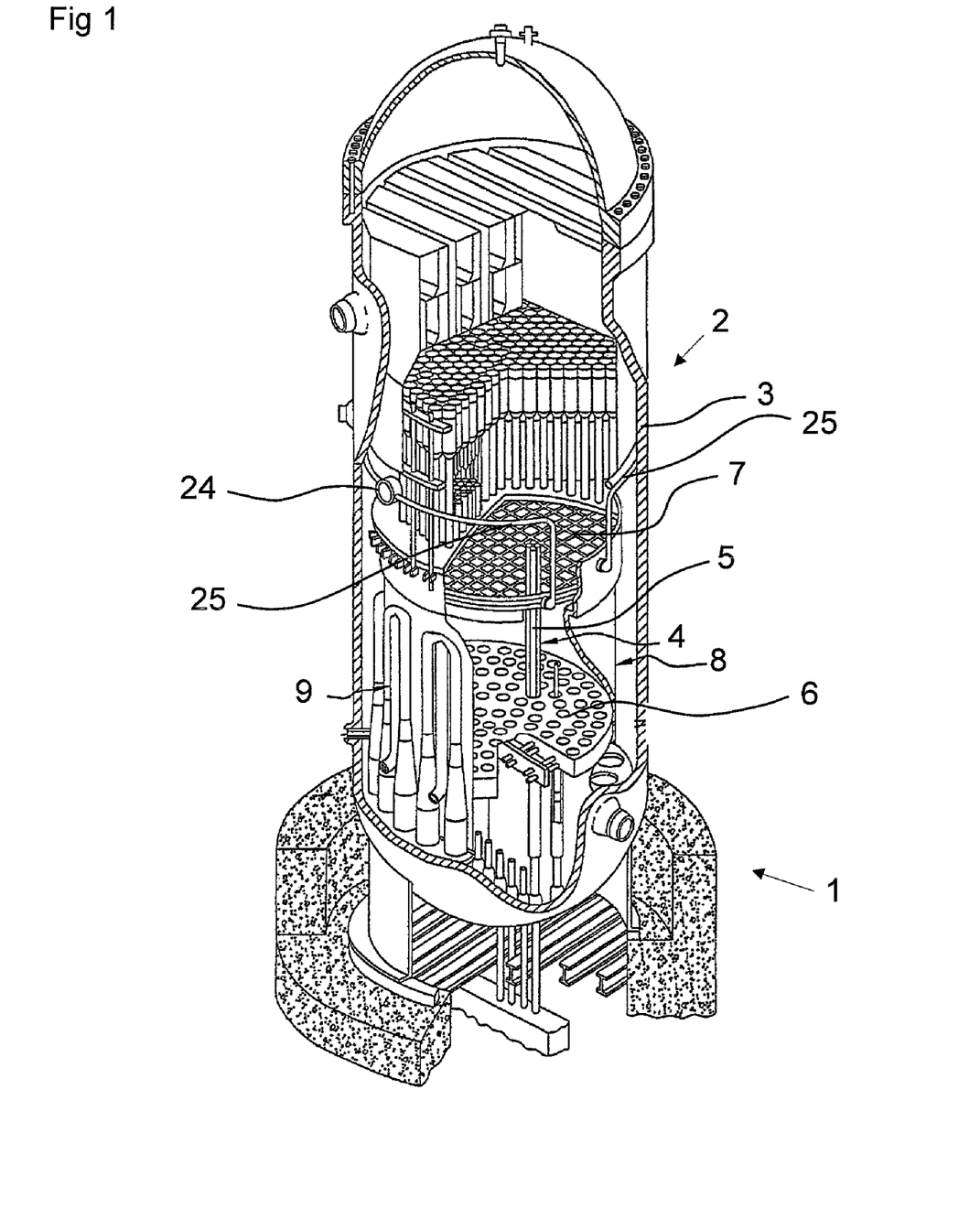
FIG. 1 discloses schematically a partly cut perspective view of a boiling water nuclear reactor.
Figure 2:
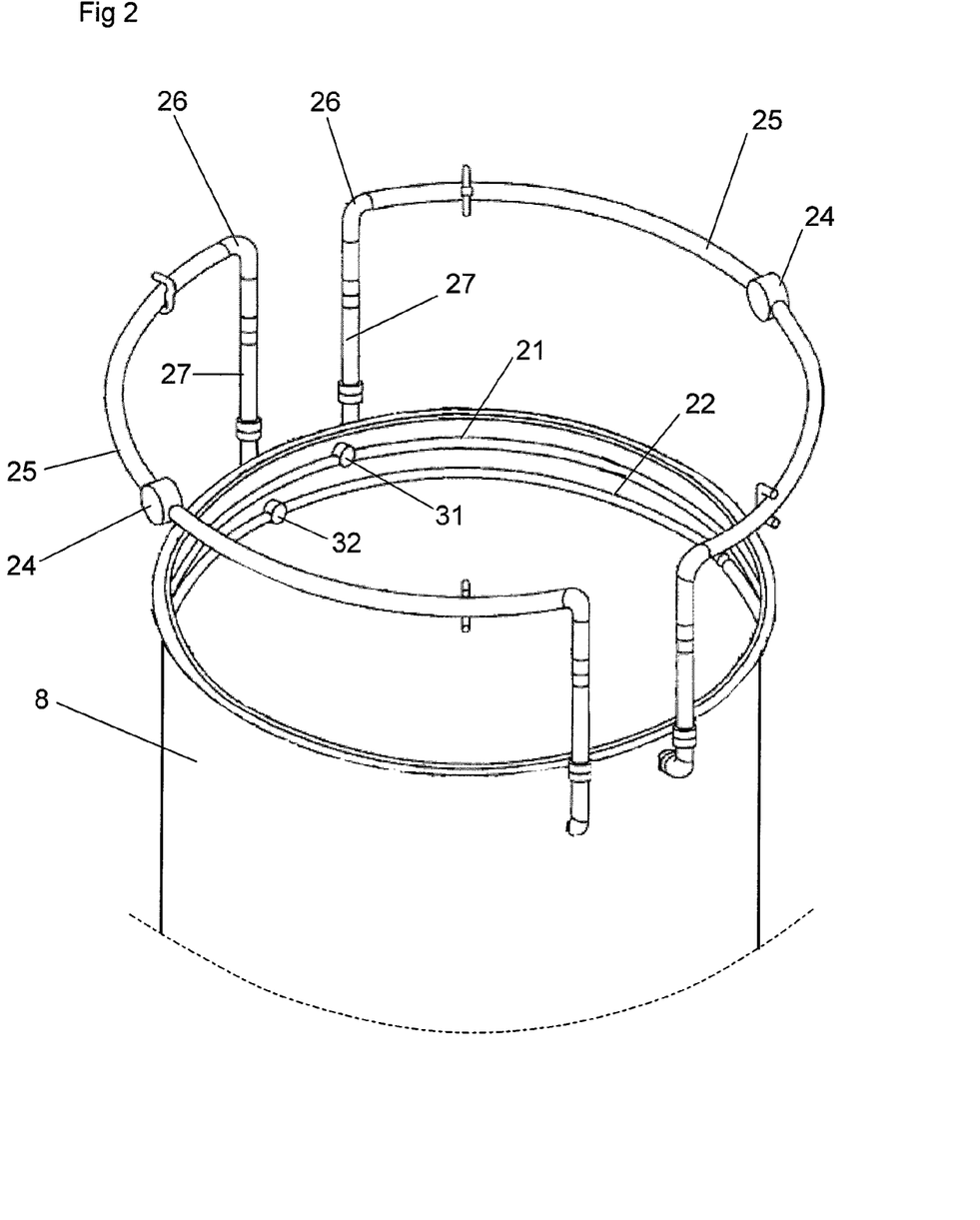
FIG. 2 discloses a perspective view of a core spray supply system for the reactor in FIG. 1.

FIG. 1 shows schematically a boiling water nuclear reactor 1, which comprises a reactor pressure vessel 2 with a wall 3. The reactor pressure vessel 2 encloses a core 4 of fuel assemblies 5 only a few of which are indicated. The fuel assemblies 5 are supported at the bottom by core plate 6 and at the top by a top guide 7. A core shroud 8, see also FIG. 2, surrounds the core 4 and is arranged within the reactor pressure vessel 2. The nuclear reactor 1 also comprises a number of pumps, in the embodiment disclosed in the form of jet pump assemblies 9, for transferring cooling water into the reactor pressure vessel 2 for cooling of the core A.

The nuclear reactor 1 also comprises a core spray system for spraying cooling water on the core 4 in case of overheating. The core spray system comprises an upper tubular core spray sparger 21 and a lower tubular core spray sparger 22, see FIG. 2, both of which have semi-circular configuration. The core spray spargers 21, 22 are oriented horizontally within a upper cylindrical section of the shroud 8 above the top guide 7. The core spray spargers 21, 22 comprises a plurality of sparger nozzles 23, see FIG. 3, for supplying water to the core 4. The semi-circular core spray spargers 21, 22 are arranged in opposed pairs to form circular rings at an upper level and a lower level. The core spray spargers 21, 22 are connected to inlet members formed in the reactor pressure vessel 2 above the shroud 8 via core spray supply piping.

Figure 3:
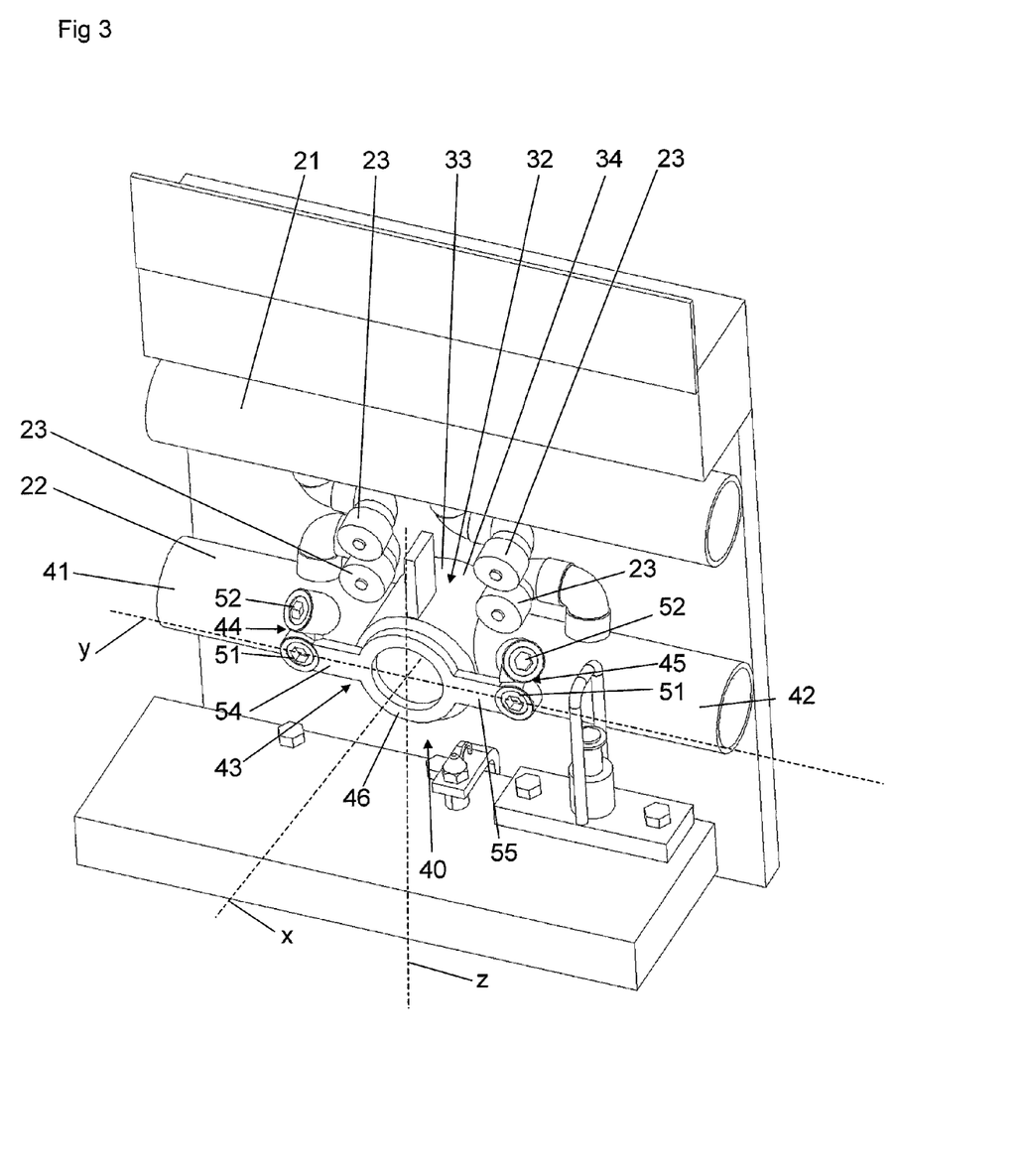
FIG. 3 discloses a perspective view of a mechanical securing assembly according to a first embodiment of the invention at a T-box assembly.
Figure 4:
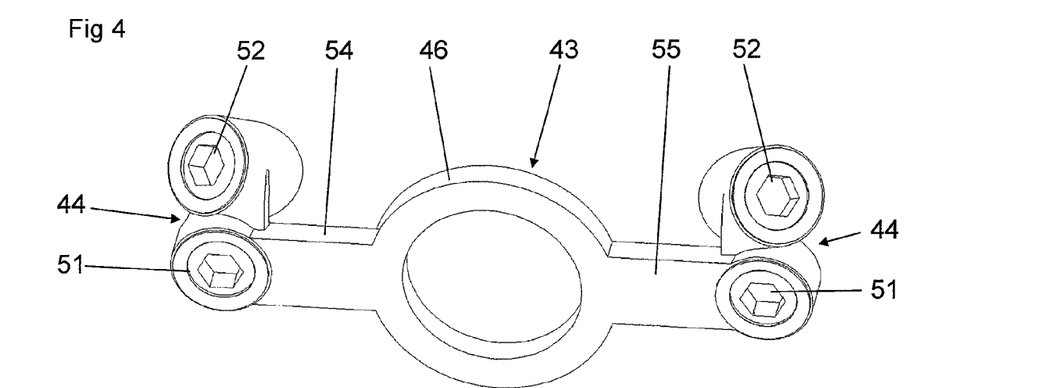
FIG. 4 discloses a perspective view the mechanical securing assembly in FIG. 3.
Figure 5:
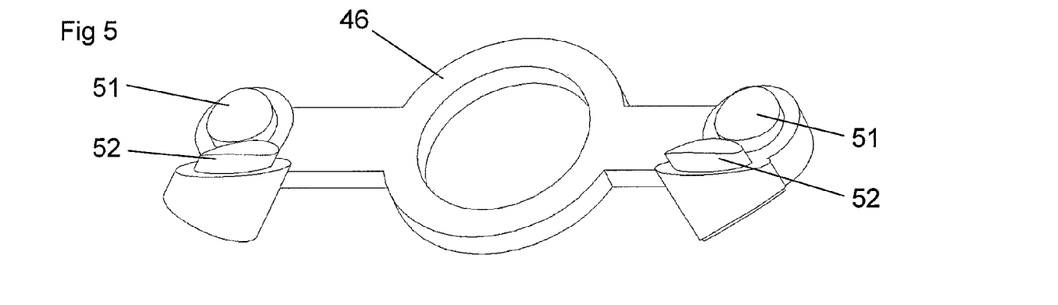
FIG. 5 discloses another perspective view the mechanical securing assembly in FIG. 3.
Figure 6:
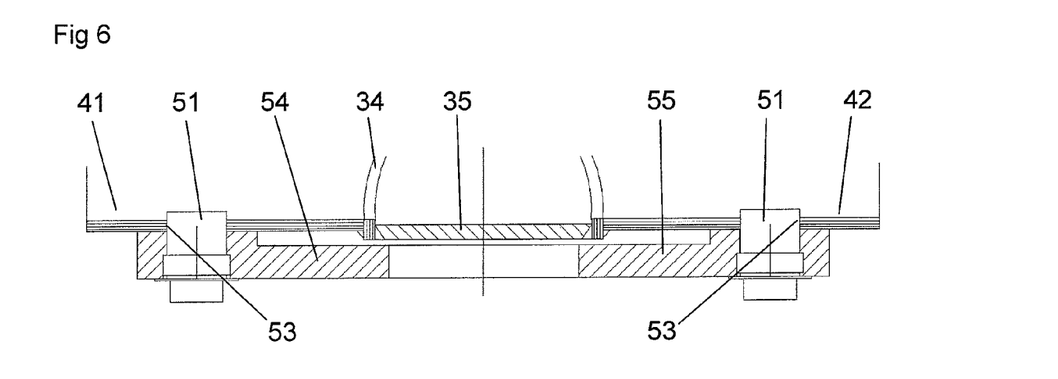
FIG. 6 discloses a sectional view through the mechanical securing assembly in FIG. 3.
Figure 11:
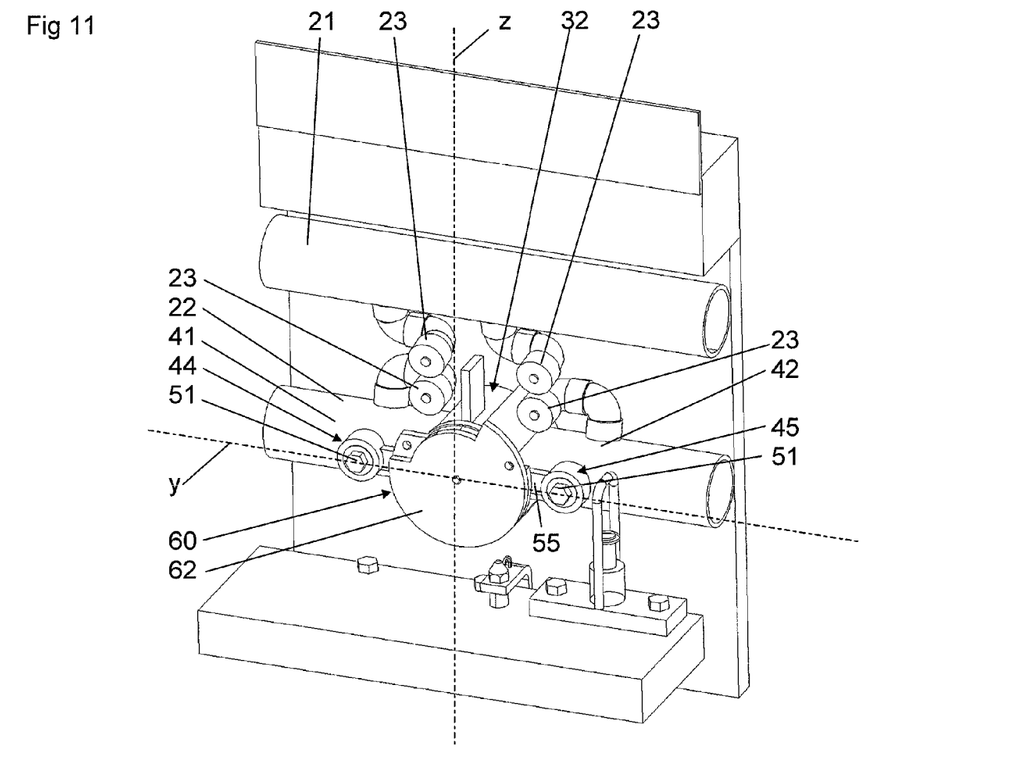
FIG. 11 discloses a perspective view of a mechanical securing assembly according to a fourth embodiment of the invention.

The inlet members comprises a flow divider or T-box assembly 24 disposed in the reactor pressure vessel 2 above the shroud 8. The core spray supply piping includes a pair of horizontal pipes 25, which extend circumferentially in opposite directions from a T-box assembly 24 to a pair of upper elbows 26 where the piping turns downwardly to connect with a pair of vertical pipes 27. Each vertical pipes 27 extend downwardly from one of the upper elbows 26 to a lower elbow 28 where the piping turns inwardly to penetrate trough the shroud 8 and connect to the upper core spray sparger 21 and the lower core spray sparger 22. Each lower elbow is connected to the respective core spray sparger 21, 22 via a T-box assembly 31, 32, see FIG. 3. Each T-box assembly 31, 32, see FIGS. 3, 6 and 11, is formed by a main pipe 33 extending along a longitudinal axis x and having cylindrical wall 34 and a closed end 35. A first pipe part 41 of the core spray sparger 21, 22 is connected to the main pipe 33 via the cylindrical wall 34 at a first interface. A second pipe part 42 the core spray sparger 21, 22 is connected to the main pipe 33 via the cylindrical wall 34 at a second interface. The first and second pipe parts 41, 42 extend outwardly from the cylindrical wall 34 in opposite directions along a primary axis y.

FIGS. 3-6 disclose a first embodiment of a mechanical securing assembly 40 adapted to secure the structural integrity of a flow passage formed by the first pipe part 41 and the second pipe part 42. In the embodiment disclosed in FIGS. 3-6, the mechanical securing assembly is provided on the lower T-box assembly 32, wherein the first pipe part 41 and the second pipe part 42 are formed by portions of the lower core spray sparger 22. It is to be noted, however, that the mechanical securing assembly 40 of the first embodiment may be used to secure the integrity of any pipes in the nuclear plant.

The mechanical securing assembly comprises a connecting member 43, a first fastening member 44 and a second fastening member 45. The first fastening member 44 is attached to the connecting member 43 and adapted to secure the connecting member 43 to the first pipe part 41. The second fastening member 45 is attached to the connecting member 43 and adapted to secure the connecting member 43 to the second pipe part 42. The connecting member 43 comprises a spring element 46 exerting a force pulling the first fastening member 44 and the second fastening member 45 towards each other along or in parallel with the primary axis y. Consequently, the spring element 46 forces the first pipe part 41 and the second pipe part 42 towards each other and against the main pipe 33 of the T-box assembly 30.

Each of the first fastening member 44 and the second fastening member 45 comprises a primary bolt member 51 adapted to be secured in a primary recess 53, see FIG. 6, in the first pipe part 41 and the second pipe part 42, respectively. Furthermore, in the first embodiment, each of the first fastening member 44 and the second fastening member 45 comprises a secondary bolt member 52 adapted to be secured in a secondary recess in the first pipe part 41 and the second pipe part 42, respectively. The connecting member 43 is thus attached to the pipe parts 41, 42 by means of four bolt members, wherein each of the primary bolt members 51 extends along a primary direction into the primary recess 53 and each of the secondary bolts member 52 extends along a secondary direction into the secondary recess. As can be seen in FIG. 3, the primary direction forms an acute angle with the secondary direction. The four bolt members will thus form means adapted to secure the connecting member 43 to the pipe parts 41, 42 with respect to the primary axis y and the longitudinal axis x.

The spring element 46 is extendable along the primary axis y by a compression of the spring element 46 along a secondary axis z forming an angle to the primary axis y, in the embodiment disclosed an angle of about 90°. The spring element has a flat or substantially flat and annular shape. Such an annular shape may be circular or substantially circular, oval, elliptic or the like. Also a polygonal basic shape is possible, although the corners of such polygon advantageously are rounded. Furthermore, the connecting member 43 has a first portion 54, extending between the first fastening member 44 and the spring element 46, and a second portion 55 extending between the second fastening member 45 and the spring element 46. The first portion 54 and the second portion 55 may extend in opposite directions from the spring element, e.g. in parallel with the primary axis y. The spring element 46 is made of sheet metal. Furthermore, all parts of the connecting member 43, i.e. the spring element 46, the first portion 54 and the second portion 55, may thus form an integrated part made of one single piece of sheet material, wherein the connecting member 46 may have a flat or plane shape.

Figure 7:
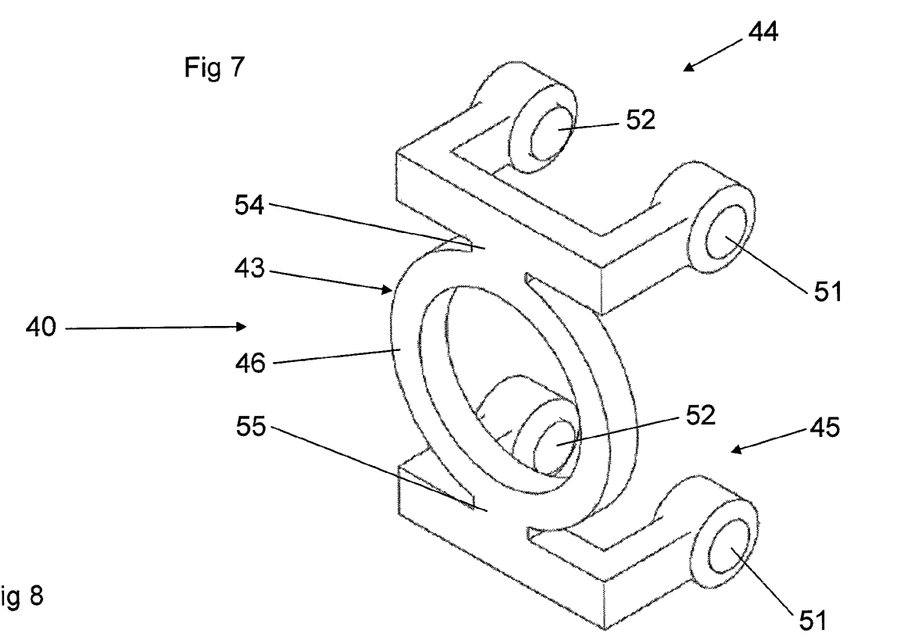
FIG. 7 discloses a perspective view of a mechanical securing assembly according to a second embodiment of the invention.
Figure 8:
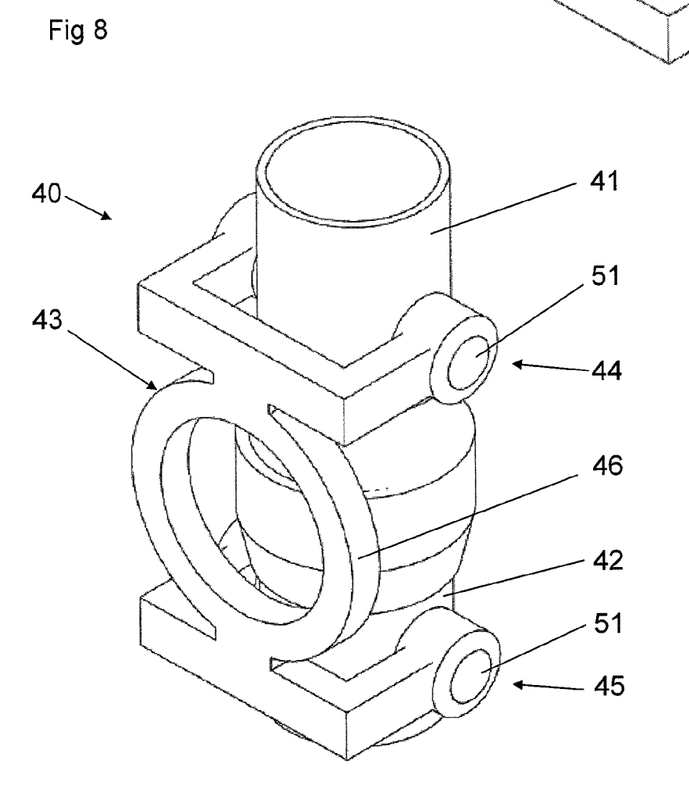
FIG. 8 discloses a perspective view of the mechanical securing assembly in FIG. 7 mounted to two pipe parts.

FIGS. 7 and 8 disclose a second embodiment, which differs from the first embodiment in that the primary direction of the primary bolt members 51 is substantially opposite to the secondary direction of the secondary bolt members 52. It is to be noted that the same reference signs have been used in all embodiments for designating elements having the same or substantially the same function. The primary and secondary bolt members 51 and 52 in the second embodiment will thus be introduced into the respective recesses 53 from a respective side of the pipe parts 41 and 42. This embodiment is suitable for all kinds of pipes, especially when there is enough space to permit the fastening members 44, 45 to be attached at two opposite sides of a pipe.

Figure 9:
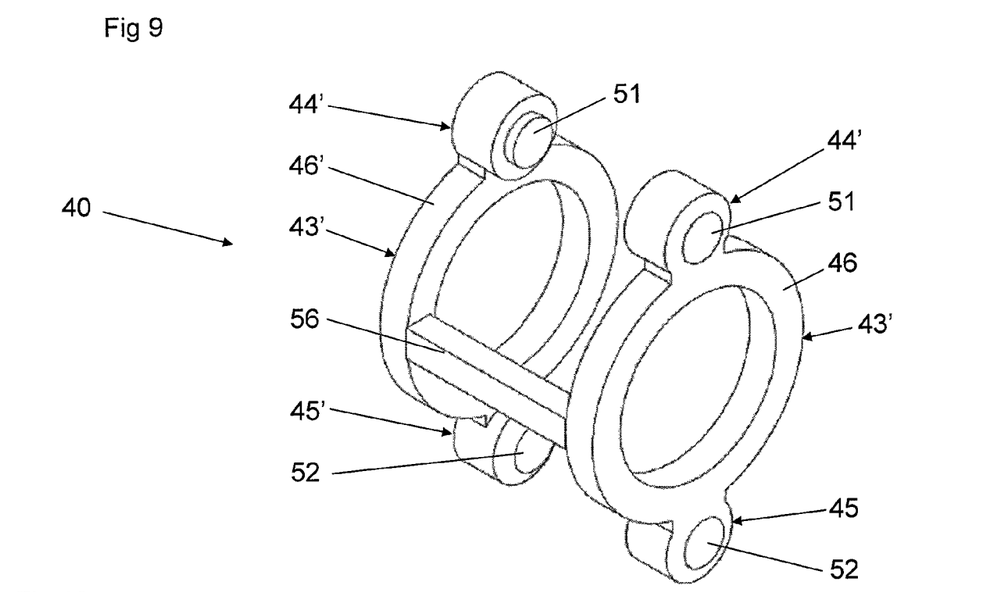
FIG. 9 discloses a perspective view of a mechanical securing assembly according to a third embodiment of the invention.
Figure 10:
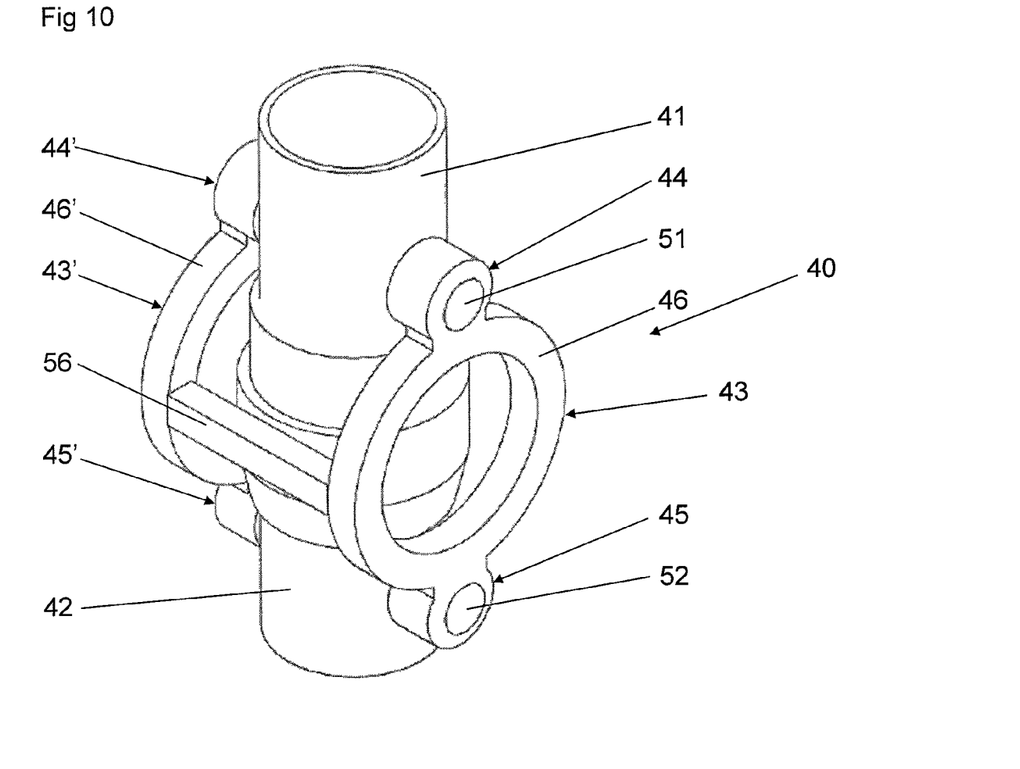
FIG. 10 discloses a perspective view of the mechanical securing assembly in FIG. 9 mounted to two pipe parts.

FIGS. 9 and 10 disclose a third embodiment, which differs from the previous embodiments in that the mechanical securing assembly 40 comprises also a further connecting member 43', a further first fastening member 44', attached to the further connecting member 43' and adapted to secure the further connecting member 43' to the first pipe part 41, and a further second fastening member 45' attached to the further connecting member 43' and adapted to secure the further connecting member 43' to the second pipe part 42. The further connecting member 43' comprises a further spring element 46' exerting a force pulling the further first fastening member 44' and the further second fastening member 45' towards each other along or in parallel with the primary axis y.

Consequently, also the further spring element 46' is adapted to force the first pipe part 31 and the second pipe part 42 towards each other. Also the further spring element 46' is extendable in parallel with the primary axis y by a compression of the further spring element 46' in parallel with the secondary axis z forming an angle to the primary axis, especially an angle of 90°. Each of the further first fastening member 44' and the further second fastening member 45' comprises a primary bolt member 51 adapted to be secured in a primary recess in the first pipe part and the second pipe part, respectively. The primary bolt member 51 of the fastening members 44 and 45 extends in a direction opposite to the direction of the primary bolt member 51 of the further fastening members 44' and 45'.

In the third embodiment, the connecting member 43 and the further connecting member 43' are thus identical or substantially identical but turned in opposite directions so that the primary bolt members 51 are directed towards each other. The connecting member 43 and the further connecting member 43' are connected to each other by means of an element 56 which in the third embodiment is shaped as a rod.

Figure 12:
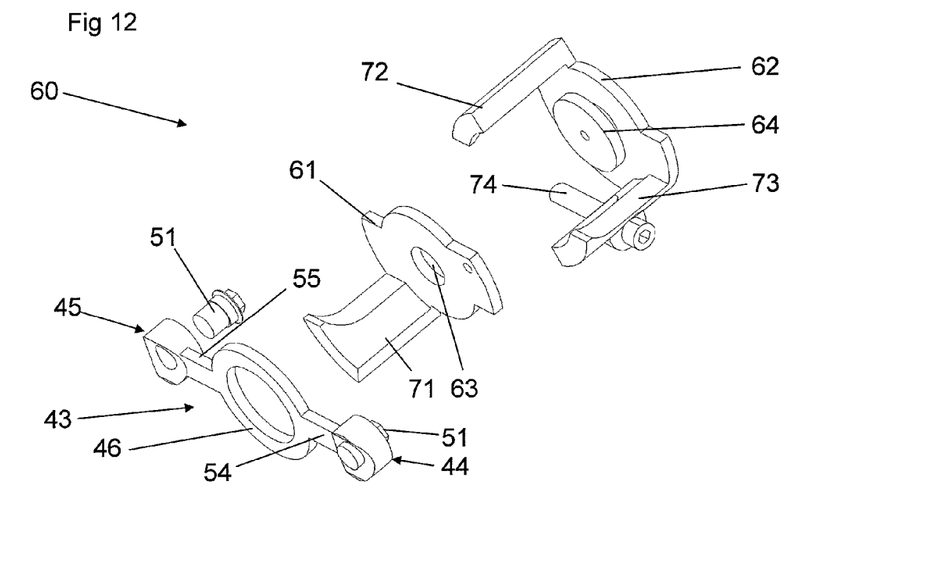
FIG. 12 discloses an exploded view of the mechanical securing assembly in FIG. 11.

FIGS. 11 and 12 disclose a fourth embodiment which comprises only one connecting member 43 and a clamping member 60 adapted to secure the connecting member 43 to the pipe parts 41. 42 with respect to the longitudinal direction x that is perpendicular to the primary axis y. The clamping member 60 encloses, in the fourth embodiment, a part of an outer periphery of the second pipe part 42.

The clamping member 60 comprises a first plate 61, provided outside the spring element 46 of the connecting member 43, and a second plate 62 provided outside the first plate 61. The first plate 61 has a circular opening 63. The second plate 62 has a circular protrusion 64 which is introduced into and fitted in the circular opening 63 of the first plate 61. The second plate 62 is thus rotatable with respect to the first plate 61 around a common center axis when the plates 61, 62 are arranged beside each other and against the connecting member 43.

The first plate 61 carries a first clamp element 71. The second plate 62 carries a second clamp element 72 adapted to co-operate with the first clamp element 61 in order to clamp the second pipe part 42 therebetween by rotating the first and second plates 61 and 62 relatively to each other and to the connecting member 43. The second plate 62 also carries a third clamp element 73 adapted to engage the first pipe part 41 as a result of the rotation of the plates 61 and 62. The rotation of the plates 61 and 62 relatively each other is accomplished by means of a mounting toll (not disclosed). The clamping member 60 is then locked in the clamping position by means of a screw bolt 74 provided in a threaded hole through the third clamp element 73.

The mechanical securing assembly 40 according to the fourth embodiment is particularly adapted to secure and maintain the T-box assembly 31 of upper sparger 21, the T-box assembly 32 of the lower sparger 22 as shown in FIG. 8, or the T-box assembly 24 of the core spray supply piping. The plates 61, 62 are then provided outside the closed end 35 of the main pipe 33 of the respective T-box assembly 24, 31, 32.

Figures 13, 14:
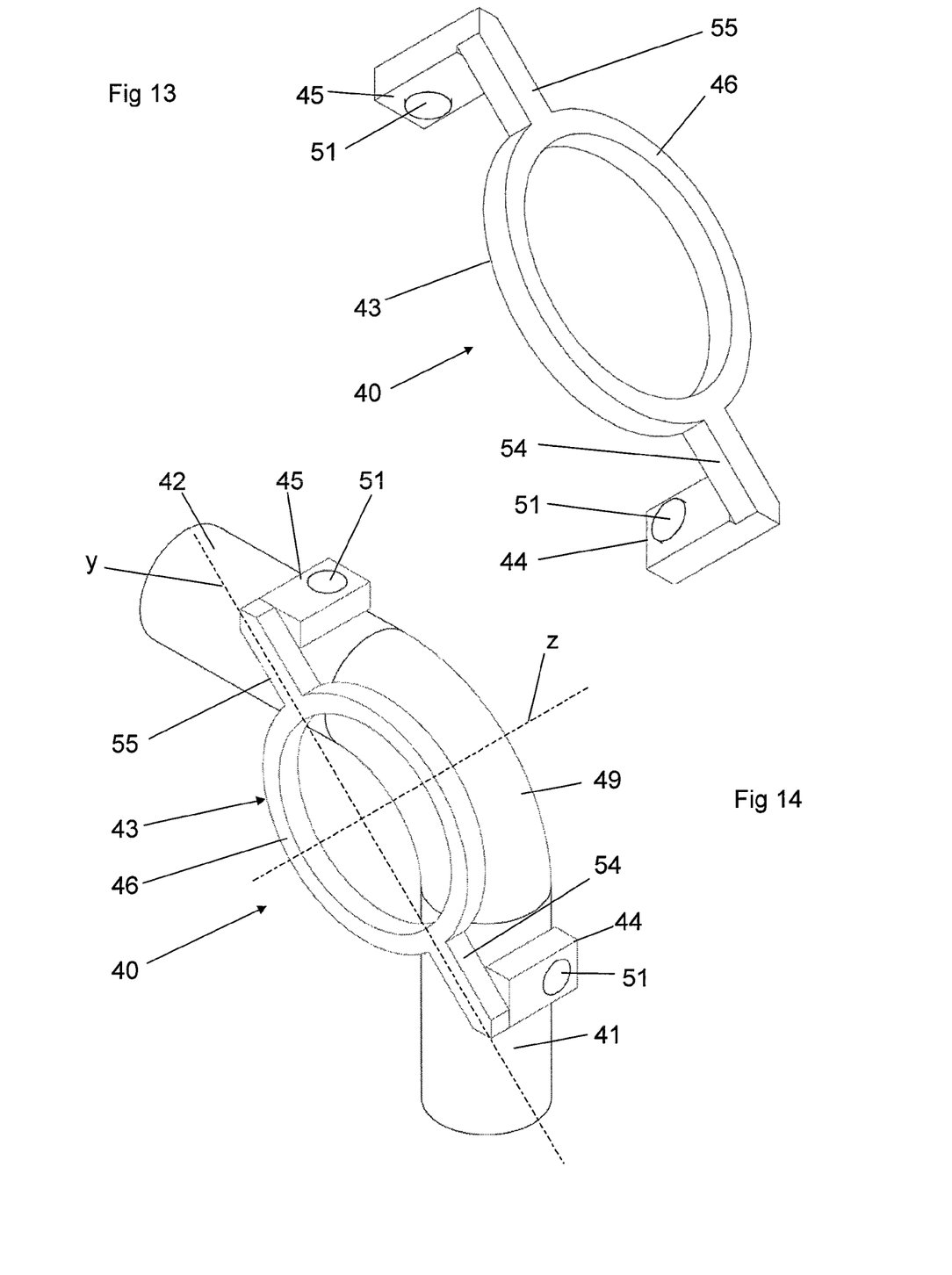
FIG. 13 discloses a perspective view of a mechanical securing assembly according to a fifth embodiment of the invention.
FIG. 14 discloses a perspective view of the mechanical securing assembly in FIG. 13 mounted to two pipe parts.

FIGS. 13 and 14 disclose a fifth embodiment, which differs from the previous embodiments in that mechanical securing assembly 40 is adapted to secure a first pipe part 41 extending along a first direction and a second pipe part 42 extending along a second direction to an intermediate angled pipe part 49, wherein the first and second directions are perpendicular to each other. The first fastening member 44 with the primary bolt member 51 secures the connecting member 43 to the first pipe part 41 and the second fastening member 45 with the primary bolt member 51 secures the connecting member 43 to the second pipe part 42. The spring element 46 exerts a force pulling the first fastening member 44 and the second fastening member 45 towards each other along a primary axis y. Consequently, the connecting member 43 and the spring element 46 force the first pipe part 41 and the second pipe part 42 against the intermediate angled pipe part 49 and thus towards each other.

Figure 15:
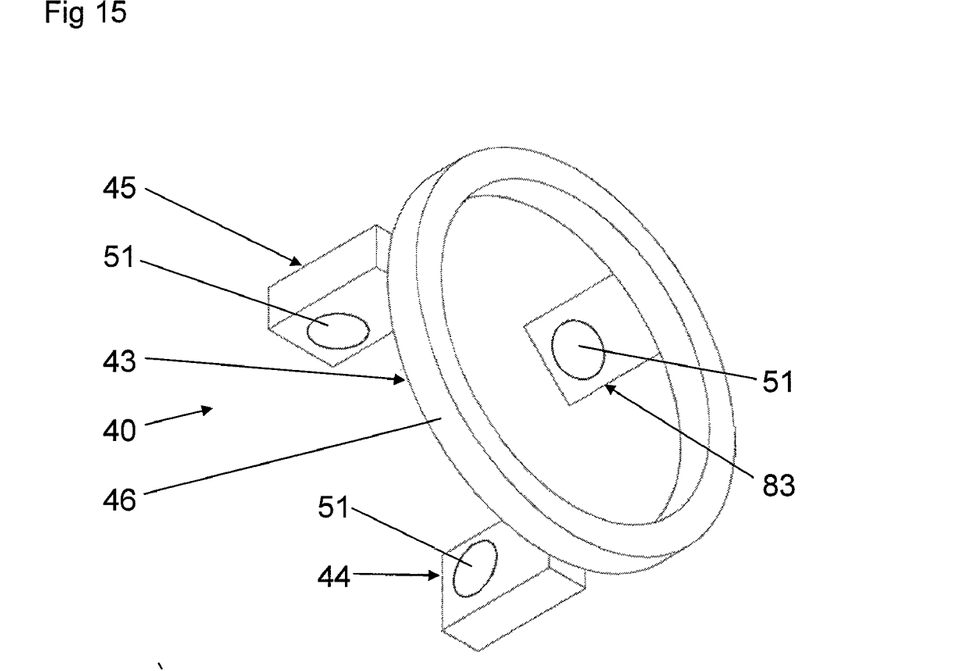
FIG. 15 discloses a perspective view of a mechanical securing assembly according to a sixth embodiment of the invention.
Figure 16:
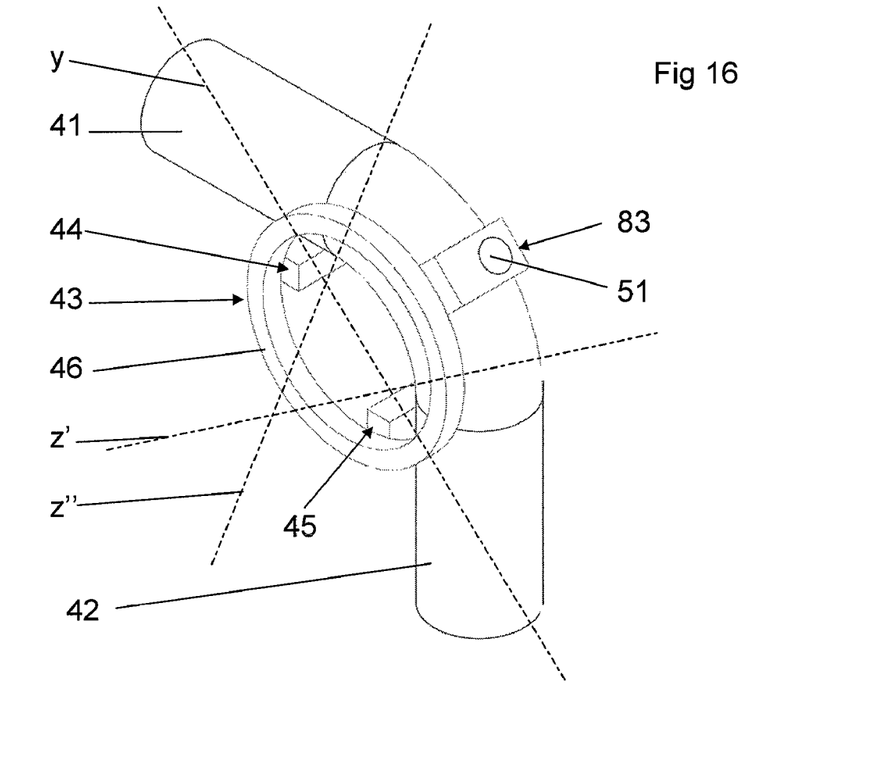
FIG. 16 discloses a perspective view of the mechanical securing assembly in FIG. 15 mounted to two pipe parts.

FIGS. 15 and 16 disclose a sixth embodiment, which differs from the fifth embodiment in that mechanical securing assembly 40 comprises a third fastening member 83 having a primary bolt member 51 and adapted to secure the connecting member tot the intermediate angled pipe part 49. The first fastening member 44 with the primary bolt member 51 secures the connecting member 43 to the first pipe part 41 and the second fastening member 45 with the primary bolt member 51 secures the connecting member 43 to the second pipe part 42. The spring element 46 exerts a force pulling the first fastening member 44 and the second fastening member 45 towards each other along the primary axis y, wherein the third fastening member 83 acts as a support on the intermediate pipe member 49. Consequently, the connecting member 43 and the spring element 46 will also in this embodiment force the first pipe part 41 and the second pipe part 42 against the intermediate angled pipe part 49 and thus towards each other. The spring element 46 is extendable along the primary axis y by compressing the spring element 46 along a secondary axis z' and/or z'' forming an angle to the primary axis y.

It is to be noted that the first fastening members 44, and the second fastening members 45, as an alternative solution within the scope of the claimed invention, may comprise other means than the bolts 51, 52 disclosed above. For instance, each fastening member 44, 45 may comprise any suitable kind of clamping member, adapted to engage or grip, by means of friction, at least a part of the outer periphery of the respective pipe part 41, 42.

The intermediate pipe part 83 may have another angle than the right angle disclosed in FIGS. 14 and 16. The intermediate pipe part 49 may also have a straight extension in parallel with the primary axis y.

The present invention is not limited to the embodiments disclosed but may be varied and modified within the scope of the following claims.

The invention claimed is:

1. A mechanical securing assembly adapted to secure the structural integrity of a flow passage formed by at least a first pipe part and a second pipe part, the assembly comprising:
   a connecting member;
   a first fastening member attached to the connecting member and adapted to secure the connecting member to the first pipe part; and
   a second fastening member attached to the connecting member and adapted to secure the connecting member to the second pipe part,
   wherein the connecting member comprises a spring element made of sheet metal, the spring element having an annular shape and exerting a force pulling the first fastening member and the second fastening member towards each other along a primary axis (y), and thus being adapted to force the first pipe part and the second pipe part towards each other,
   wherein the spring element is extendable along the primary axis (y) by a compression of the spring element along a secondary axis (z) forming an angle to the primary axis (y);
   wherein the connecting member has a first portion extending between the first fastening member and the spring element, and a second portion extending between the second fastening member and the spring element, and wherein the spring element, the first portion, and the second portion constitute an integrated part made of one single piece of sheet metal.

2. An assembly according to claim 1, wherein the first portion and the second portion extend in opposite directions from the spring element.

3. An assembly according to claim 1, wherein each of the first fastening member and the second fastening member comprises a primary bolt member adapted to be secured in a primary recess in the first pipe part and the second pipe part, respectively.

4. An assembly according to claim 3, wherein the assembly comprises means adapted to secure the connecting member to the pipe parts with respect to a direction (x) being perpendicular to the primary axis (y), and wherein said means comprises, in each of the first fastening member and the second fastening member, a secondary bolt member adapted to be secured in a secondary recess in the first pipe part and the second pipe part, respectively.

5. An assembly according to claim 4, wherein each of the primary bolt members extends along a primary direction into the primary recess and each of the secondary bolts member extends along a secondary direction into the secondary recess, wherein the primary direction forms an angle with the secondary direction.

6. An assembly according to claim 4, wherein each of the primary bolt members extends along a primary direction into the primary recess and each of the secondary bolt members extends along a secondary direction into the secondary recess, wherein the primary direction is substantially opposite to the secondary direction.

7. An assembly according to claim 1, wherein the assembly comprises means adapted to secure the connecting member to the pipe parts with respect to a direction (x) being perpendicular to the primary axis (y).

8. An assembly according to claim 7, wherein said means comprises a clamping member adapted to secure the connecting member to the pipe parts with respect to a direction (x) being perpendicular to the primary axis (y) by enclosing at least a part of an outer periphery of at least one of the first pipe part and the second pipe part.

9. An assembly according to claim 8, wherein the clamping member comprises a first plate provided outside the spring element and comprising a first clamp element, and a second plate provided outside the first plate and comprising a second clamp element, wherein the plates are rotatable relatively to each other to displace the clamp elements towards and away from each other.

10. An assembly according to claim 9, wherein the assembly is adapted to secure and maintain a T-box assembly in a nuclear reactor, the T-box assembly being formed by a main pipe extending along a longitudinal axis (x) and having a cylindrical wall and a closed end, the first pipe part and the second pipe part, the first pipe part being connected to the main pipe via the cylindrical wall at a first interface, the second pipe part being connected to the main pipe via the cylindrical wall at a second interface and the first and second pipe parts extending outwardly from the cylindrical wall in a opposite directions in parallel with the primary axis (y).

11. An assembly according to claim 10, wherein the plates are adapted to be provided outside the closed end of the main pipe.

12. An assembly according to claim 10, wherein the primary axis (y) is perpendicular or substantially perpendicular to the longitudinal axis (x).

13. An assembly according to claim 1, wherein the assembly comprises:
   a further connecting member;
   a further first fastening member attached to the further connecting member and adapted to secure the further connecting member to the first pipe part; and
   a further second fastening member attached to the further connecting member and adapted to secure the further connecting member to the second pipe part,
   wherein the further connecting member comprises a further spring element exerting a force pulling the further first fastening member and the further second fastening member towards each other in parallel with the primary axis (y), and thus being adapted to force the first pipe part and the second pipe part towards each other, and wherein the further spring element is extendable in parallel with the primary axis (y) by a compression of the further spring element along a secondary axis forming an angle to the primary axis (y).

14. An assembly according to claim 13, wherein each of the further first fastening member and the further second fastening member comprises a primary bolt member adapted to be secured in a primary recess in the first pipe part and the second pipe part, respectively.

15. An assembly according to claim 1, wherein the primary axis (x) is perpendicular or substantially perpendicular to the secondary axis (z).

16. An assembly according to claim 1, wherein an intermediate pipe part is arranged between the first pipe part and the second pipe part.

* * * * *